June 19, 1928.

G. W. ESCHENBACH 1,674,005

RECORD HOLDING MARKER

Filed July 19, 1926    2 Sheets-Sheet 1

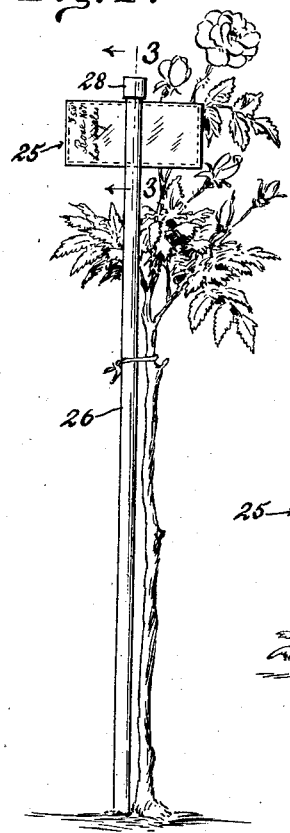

Fig. 1.

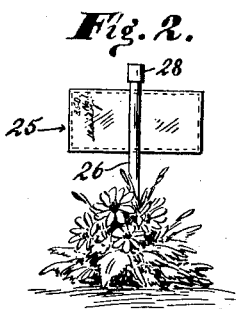

Fig. 2.

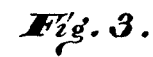

Fig. 3.

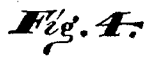

Fig. 4.

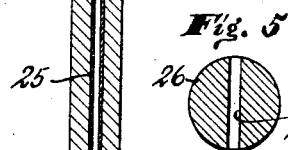

Fig. 5.

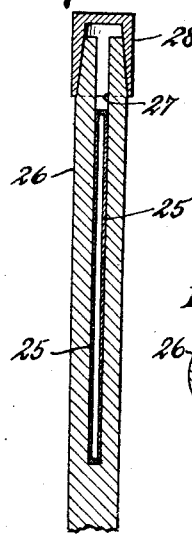

Fig. 6.

| NEVERLOSE Growing Record Card 35-01 | |
|---|---|
| Common Name ROSE | Individual Plant No. 7 |
| Individual Name or Variety | Los Angeles |
| DATE | MEMORANDA |
| 4/3/26 | Received and planted — strong bush. |
| 6/7 | First bloom — gorgeous. |
| 6/15 | Several buds forming — growing fine. |

Fig. 7.

| NEVERLOSE Blooming Record Card 35-B | | | | | | | |
|---|---|---|---|---|---|---|---|
| Common Name Rose | | | | Individual Plant No. 7 | | | |
| Individual Name or Variety Los Angeles | | | | | | | |
| DATE | Number of Blooms | | | DATE | Number of Blooms | | |
|  | Med'm | Good | Fine |  | Med'm | Good | Fine |
| 6/7/26 |  |  | 1 |  |  |  |  |
| 6/23 |  | 1 | 3 |  |  |  |  |
| 7/19 | 1 | 2 | 4 |  |  |  |  |
| 8/1 |  | 1 | 5 |  |  |  |  |
| 8/9 | 1 | 3 | 3 |  |  |  |  |

Inventor.
Gustavus W. Eschenbach.
By Lockwood & Lockwood
His Attorneys

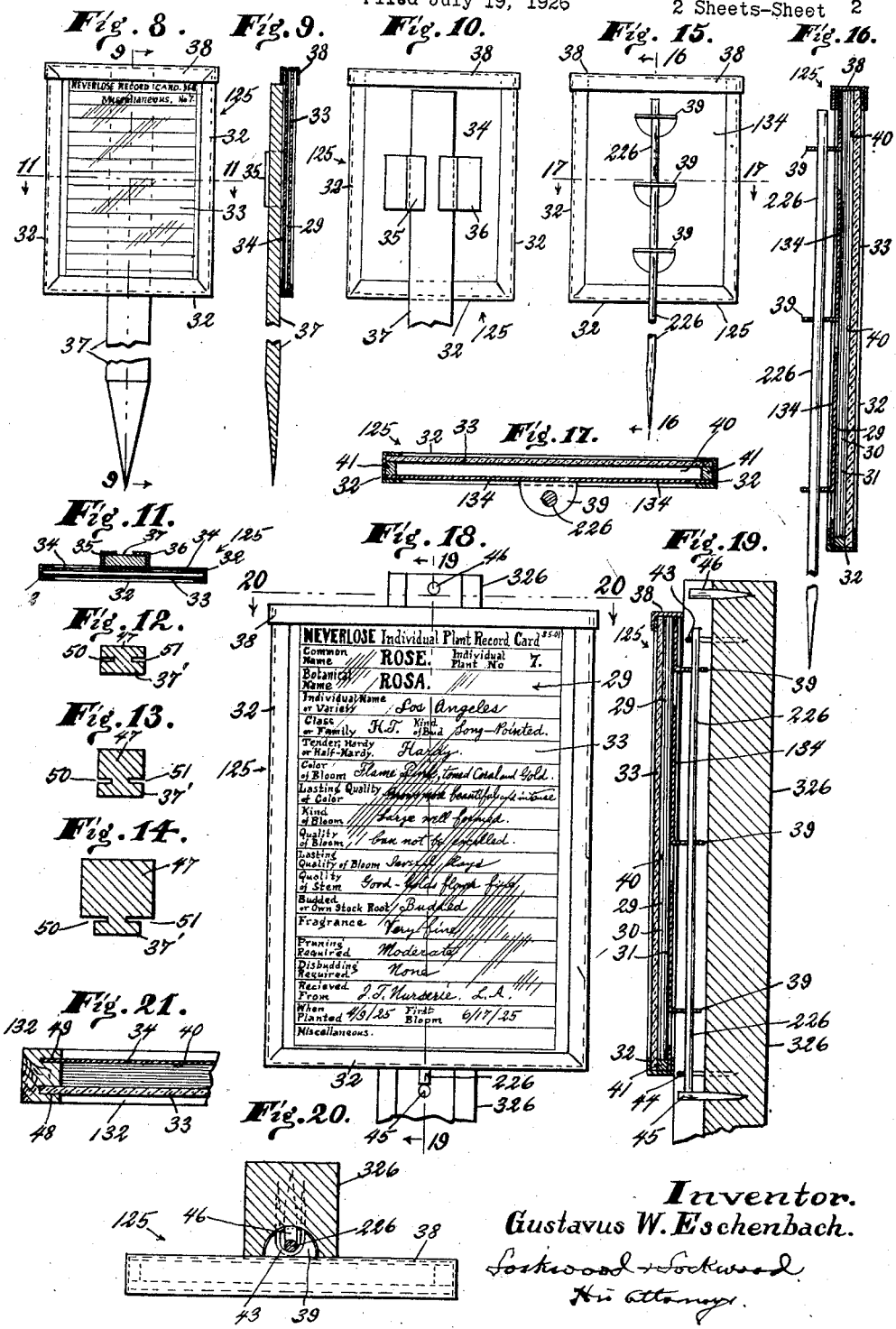
June 19, 1928.  G. W. ESCHENBACH  1,674,005
RECORD HOLDING MARKER
Filed July 19, 1926   2 Sheets-Sheet 2
Inventor.
Gustavus W. Eschenbach.

Patented June 19, 1928.

1,674,005

UNITED STATES PATENT OFFICE.

GUSTAVUS W. ESCHENBACH, OF LOS ANGELES, CALIFORNIA.

RECORD-HOLDING MARKER.

Application filed July 19, 1926. Serial No. 123,384.

This invention relates to a record holding marker that is adapted for the use of gardeners, florists, horticulturists and agriculturists; and an object thereof is to provide a simple and efficient means for marking the objects and recording the essential data relative to the propagation of trees, shrubs, plants and flowers that can be arranged adjacent growing objects under observation so that the record connected therewith is convenient when data is to be reviewed or to be noted and recorded thereon for the purpose of a selection of the better quality of seeds or plants for future propagation.

To that end I provide charts, cards or the like that are tabulated and arranged so that all the data relating to the soil, planting, fertilizing, cultivation and irrigation of vegetation as well as data relating to the growth, flowerage and fruitage of the vegetation can be easily, quickly and conveniently recorded thereon; in addition to which I provide a simple and efficient means for holding and preserving the data that is adapted as a marker to be arranged adjacent the objects under observation so that a selection of the best seed or plants can be made for future propagation.

Another object of this invention is to provide a record holding marker that in addition of being of great usefulness in recording and preserving data in large nurseries, green houses, public gardens and parks, is also especially adapted to the use of amateur and professional gardeners as well as public and private schools in which the agricultural and horticultural arts are taught and studied.

Heretofore the marking and recording of data relative to individual trees, shrubs, plants and flowers as they have been planted and grown, to a large extent, have been without system or order, many growers depending entirely upon their memory for preserving valuable information that has been easily lost by forgetfulness; and a further object of this invention is to provide an orderly system of marking and recording data of individual trees, shrubs, plants and flowers as they are grown, so that the marker, record and object under observation are always associated together.

Another object of this invention is to provide a record holding marker that in addition to functioning as a record keeping appliance also will be effective in holding the attention and increasing the interest of students in the study and propogation of plant life. That is by employing this marker the student can keep the record and can have before him not only the common and botanical name of each plant, but also has a complete record of its unfolding that is a pleasurable, interesting story that he has helped to make or which he can easily comprehend without arduous study.

A feature of invention is shown in the novel means for supporting the chart or card housing and also in the means employed for protecting charts or cards from inclement weather.

Other features of invention are shown in the novel construction, combination and arrangement of the various parts whereby a record holding marker is provided that is neat and pleasing in appearance, easy to construct and assemble, light to handle, and effective and durable in use.

Other objects, advantages and features of invention may appear from the accompanying drawings, the subjoined detailed description and the appended claims.

In the drawings:

Fig. 1 is a perspective view of a record holding marker constructed in accordance with this invention, showing it also used as a support for a flower.

Fig. 2 is a view analogous to Fig. 1 showing the appliance used only as a record holding marker and arranged in a bed of daisies.

Fig. 3 is an enlarged fragmental section on the line 3—3 of Fig. 1; showing the record holding housing secured in its support.

Fig. 4 is a view analogous to Fig. 3 with the cap and record holding housing removed from the support.

Fig. 5 is an enlarged cross section of the support on the line 5—5 of Fig. 4.

Fig. 6 is a view of a growing record card adapted to be associated with a marker.

Fig. 7 is a blooming record card adapted to be associated with a marker.

Fig. 8 is a fragmentary view of a record holding marker analogous to Fig. 1 showing a front view of a modified form of housing for holding the record cards.

Fig. 9 is a central vertical section on the line 9—9 of Fig. 8.

Fig. 10 is a back view of the housing shown in Fig. 8.

Fig. 11 is a cross section on the line 11—11 of Fig. 8.

Fig. 12 is a cross sectional view of a stake for supporting the record holding housing that is a modified form of the support shown in Fig. 8.

Fig. 13 is another cross sectional view of a support analogous to the support shown in Fig. 12.

Fig. 14 is still another cross sectional view of a support for the housing that is analogous to that shown in Fig. 12.

Fig. 15 is a view analogous to Fig. 10 showing a modified form of support for the housing and means for connecting it to the housing.

Fig. 16 is an enlarged central vertical section on the line 16—16 of Fig. 15.

Fig. 17 is an enlarged section on the line 17—17 of Fig. 15, with the record cards.

Fig. 18 is an enlarged front view of the housing shown in Figs. 15, 16 and 17 connected to a different form of support; and also showing a front view of an individual plant record card that is visible through a transparent pane of the housing.

Fig. 19 is a central vertical section on the line 19—19 of Fig. 18.

Fig. 20 is a cross section through the upper part of the support of Fig. 18.

Fig. 21 is a fragmental sectional view of a modification of the housing shown in Fig. 8.

The record holding marker comprises a housing 25 that is arranged on a support 26. The housing 25 can be formed in various ways, but preferably it is a transparent envelope that is adapted to hold charts, cards or the like that have or can have data inscribed thereon; and this housing is waterproof so that it will protect the enclosed record. The support 26 can be an ordinary round wooden stake such as is shown in Figs. 1 to 5, inclusive, or it can be a stake rectangular in cross section as shown in Figs. 8 to 14, and 18 to 20, inclusive, or it can be an iron rod as indicated in Figs. 15 to 19 inclusive; it being understood of course that these stakes are of various lengths and sizes and all having sharpened lower ends suitable for inserting in the ground.

The simplest form of construction is shown in Figs. 1 to 5, and as seen therein the support comprises a round stake with a slot 27 in its upper end that is sufficiently wide and deep to receive the housing 25. The housing 25 is secured in the slot 27 by means of a cap 28 that has a tapered inner wall that is adapted to be fitted tightly to the tapered end of the stake 26; so that when in place as shown in Figs. 1 to 3, it will pinch the side walls of the slot 27 against the housing 25 to hold it in place.

The recording means can comprise a series of tabulated charts, cards and the like, with spaces thereon in which data can be recorded, but for the sake of brevity only three cards 29, 30 and 31 are shown in detail and they are illustrated in Figures 6, 7 and 18.

The card 29 shown in Fig. 18 is tabulated and printed with data that is of the most interest in the growing of flowers, and as therein seen both the common and botanical name of the flower, as well as the plant number or card indexing number, are printed at the top of the card. Then to the left hand side of the card the various topics are printed, of which records are to be kept, and to the right of those topics are spaces in which a record of the plant can be kept.

The printed matter at the top of the cards 30 and 31 are substantially like that of card 29 except that the botanical name is omitted.

At the left of card 30 are arranged spaces for dates and to the right of these dates are spaces for memoranda.

Card 31 is provided with a double tabulated space for dates of blooming and spaces for the quality of bloom such as medium, good and fine.

For the purpose of illustrating the invention it is assumed that the cards 29, 30, 31 contain a record kept of the rose shown in Fig. 1. From the cards 29 and 30 it is seen that a strong bush of the variety rosa was received and planted on the 9th of April, 1925, and the bush given an individual name, as Los Angeles, and an individual number, as 7, for use in distinguishing the plant from other plants which will be later explained.

The record of the flower relative to the printed topics is kept in long hand and as seen in card 29 the rose, in addition to other matter, has long pointed buds, is hardy, has a flaming pink color bloom, toned coral and gold that in time increases in intensity, that is large and well formed and fragrant, and that it is of budded stock requiring moderate pruning and no disbudding.

Card 30 gives the dates of its blooming, which is June 7, 1925; then a later date, June 15, is given when other buds are forming and the plant growing fine. Then in card 31 the actual results of the blooming of plant No. 7 are given. As seen therein one fine bloom is recorded on the 8th day of June 1925. On the 23rd of that month there was one good and three fine blooms; then on the 19th of July there was one medium, two good and four fine blooms. On August 8th there was one good and five fine roses, and then again on the 9th there was one medium, three good and three fine.

From the foregoing it can be easily seen that a complete record of any individual plant can be kept associated with it so that there can be no mistake as to what plant the record belongs.

In the upper right hand corner of the cards is printed an identifying numeral, as 7, previously referred to, that is used to distinguish the plant from other plants and also used when the record is kept in duplicate or triplicate as is desirable in large gardens, nurseries or schools, so that one or more complete files can be kept in an office, as well as keeping a record adjacent the plant, so that at any desired time a card can be drawn from the file and examined to note the progress of any individual plant. By this means a manager of a nursery, school or garden can, without leaving the office, know the actual growing condition of each individual plant, so that when the record indicates that any plant or plants are not doing well an attendant can be sent to learn the causes, and by means of the index and marker associated with each plant the attendant can easily and quickly locate the plant for which he is seeking.

Also in the upper left hand corner of the cards are arranged numerals such as 35—01 shown in Fig. 6 that indicate the sizes of the record cards and also the dimensions of the card housings. That is the figures 35—01 indicate that the card shown in Figs. 1 and 6 is three inches wide and five inches long; and the figures 01 indicate that the housing is large enough to hold that size card.

In Fig. 7 the size card and stake numerals are indicated as 3, 5—B, which means that the size of the card is three by five inches and that a stake rectangular in cross section is used; and that the dimensions of the stake are one-fourth of an inch thick by three fourths of an inch wide and twenty four inches long. It is understood that the record holding markers, cards and stakes are made in various sizes; and that the numerals and letters for indicating the sizes of the cards and stakes can be arranged in various combinations that will simplify the matter of ordering and shipping them. In other words if a grower has record holding markers that will hold cards of a size three by five inches he has only to give the numerals 3, 5 to indicate the size of the card he requires; and also the size of stakes are ordered in the same way.

As previously stated, the record holding markers are adapted to be arranged adjacent individual plants and also they can be arranged to support the plants with which they are associated, as shown in Fig. 1; but in actual practice there are many trees, shrubs, plants and flowers as well as other vegetation, that need no support, as indicated in Fig. 2, in which instance the marker is simply inserted in the ground adjacent the plant. By this system of marking each individual object a record can be kept so that one object can be distinguished from one another. In other words two or more roses may be planted side by side and by means of my marker they can be easily distinguished one from the other, as can also be their records, and this is not possible when the plants are unmarked and their record is kept in a place remote from the plant.

In Figs. 8 to 11, inclusive, I show a modified form of housing 125. As seen therein I provide a channel iron 32 that is bent to form the sides and bottom of the housing 125, and inside of the channel is arranged a front transparent pane 33 and in the back a sheet metal plate 34. The plate 34 has a pair of oppositely arranged lugs 35, 36 that are bent to fit a rectangular stake 37, as best shown in Figs. 10 and 11, and these lugs are arranged to frictionally engage the stake so as to detachably and slidably hold the marker at any predetermined position on the stake 37. The cap 38 can be removed when the cards or folders are to be inserted therein or removed therefrom.

In Figs. 15 to 20, inclusive, I show a housing 125 with a modified form of back plate 134. As seen therein the metal back 134 has aligned lugs 39 extending outward at right angles from the back plate; and these lugs are perforated in the center so that an iron stake 226 can be extended through them so as to hold the housing 125 adjacent the top of the stake; and the lower end of the stake is sharpened so that it can be easily inserted in the ground.

It is understood that the lugs 39 may be bent at an acute angle to the back plate 134 so that they will grip the stake 226 and hold the housing in any desired position.

The housing, if desired, can be provided with an enlarged chamber 40, as indicated best in Figs. 16, 17, 19 that is adapted to hold a number of cards or circulars and when so constructed I provide small spacing bars 41, at the sides and bottoms to space the transparent pane 33 from the back plate 134.

In Figs. 18, 19 and 20 I provide a grooved stake 326 that is adapted to support the housing 125 previously described and shown in Figs. 15 to 17 inclusive. The rod 226 has its sharpened end cut off so that it can be arranged between and supported by two staples 43, 44 that are driven into the grooved portion of the stake 326. The staples 43, 44 are arranged to hold the housing adjacent the upper end of the stake. That is I arrange the staples between a lower pin 45 and an upper pin 46 that limit the movement of the rod 226 when the housing is to be attached to or detached from the stake.

As seen in Fig. 19 the housing can be removed from the stake 326 by first moving the housing upward so that the rod 226 will be moved toward the upper bin 46 to a position where the lower end of the rod can be moved outward clear of the staple 44, after which the housing can be moved outward and downward a sufficient distance to be clear of the staple 43. The housing can be remounted on the stake 326 by a reverse movement thereof, and when in place the rod 226 rests on the lower pin 45.

If desired the top and sides of the housing can be made of wood as shown in Fig. 21, and when so constructed the sides and bottom 132 can be provided with a groove 48 for the transparent pane 33 and another groove 49 for the back plate 34. In Figs. 12 to 14, inclusive, I show stakes of various sizes each adapted to have the lugs 35, 36 of the back plate 34 connected thereto; that is, these stakes as shown in cross section are rectangular with the portions 37' all of the same size, the enlarged part 47 of the stakes being back of the rectangular portion 37'. In other words, in forming these stakes they are recessed on the sides at 50 and 51 to provide openings into which the free ends of the lugs 35, 36 can be extended to hold the housing to the stake.

It is understood that various forms of housings and supports can be provided but for the sake of brevity only a few generic modifications are shown.

The record cards shown in Figs. 6, 7 and 18 of this application for Letters Patent with other similar growing record marker cards are used in subject matter for a separate application for United States Letters Patent simultaneously filed with this case under the title of Marker record cards, Serial Number 123,385, filed July 19, 1926.

I claim as my invention:

1. A record holding marker including a housing having an open upper end and its bottom and sides formed of a channel iron; a transparent front pane slidably and removably mounted in said housing; a metal back plate slidably and removably mounted in said housing; a record card for plants and trees; bars arranged between said pane and plate to form a space for said record card; a removable cap for closing the upper end of said housing; and a stake on which said housing is adjustably supported.

2. A record holding marker including a housing having an open upper end; a channel iron frame forming the bottom and sides of said housing; a transparent pane fitted in said channel iron frame to form the front of said housing; a sheet metal plate fitted in said channel iron frame to form the back of said housing; a growing record card for plants and trees; wooden bars arranged between said pane and plate to form a space for said card; a removable cap for closing the upper end of said housing, and a stake adjustably connected to said plate for supporting said housing adjacent a plant or tree for the purpose specified.

3. A record holding marker including a housing having an open upper end, a channel iron bent to form the bottom and sides of said housing; a glass closing the front of said housing; a sheet metal plate for closing the back of said housing; a growing record card for plants and trees; wooden bars arranged at the marginal edges of and between said glass and plate to form a space for said card; a cap for closing the upper end of said housing; a rod; and aligned perforated lugs integral with said plate for slidably and adjustably supporting said housing on said rod, said lugs arranged to frictionally engage said rod to hold said housing at any desired position thereon.

In witness whereof, I have hereunto affixed my signature.

GUSTAVUS W. ESCHENBACH.